United States Patent [19]

Wall et al.

[11] Patent Number: 4,789,471
[45] Date of Patent: Dec. 6, 1988

[54] PRESSURE FILTERS

[76] Inventors: George W. Wall, Rest Easy, St. Blazey Road, Par, Cornwall; Glyn T. Jones, 14, Cooperage Road, Trewoon, St. Austell, Cornwall, both of United Kingdom

[21] Appl. No.: 811,803

[22] Filed: Dec. 20, 1985

Related U.S. Application Data

[63] Continuation-in-part of Ser. No. 572,643, Jan. 20, 1984, abandoned.

[30] Foreign Application Priority Data

Jan. 23, 1983 [GB] United Kingdom ............... 8304723
Jan. 24, 1983 [GB] United Kingdom ............... 8301927

[51] Int. Cl.$^4$ .................. B01D 25/12; B01D 29/16
[52] U.S. Cl. .................. 210/231; 100/211; 210/358; 210/455; 210/498
[58] Field of Search ............ 210/224, 231, 350, 351, 210/455, 507, 508, 247, 358, 498; 572/643

[56] References Cited

U.S. PATENT DOCUMENTS

| | | | |
|---|---|---|---|
| 1,011,976 | 12/1911 | Lithgow et al. | 210/231 |
| 1,316,404 | 9/1919 | Wilson | 210/231 |
| 1,516,463 | 11/1924 | Stuart | 210/231 |
| 1,520,781 | 12/1924 | Stuart | 210/231 |
| 1,883,468 | 10/1932 | Barbour . | |
| 2,364,366 | 12/1944 | Jahreis . | |
| 2,818,977 | 1/1958 | Crist . | |
| 3,708,072 | 1/1973 | Schmidt, Jr. | 210/350 |
| 3,762,560 | 10/1973 | Gwilliam | 210/350 |
| 3,805,961 | 4/1974 | Clark et al. | 210/350 |
| 3,850,812 | 11/1974 | Schneider | 210/231 |
| 4,180,611 | 12/1979 | Schultheiss et al. | 210/507 |
| 4,385,644 | 5/1983 | Kaempen | 156/173 |

FOREIGN PATENT DOCUMENTS

| | | |
|---|---|---|
| 658643 | 5/1965 | Belgium . |
| 1001589 | 1/1957 | Fed. Rep. of Germany ...... 100/211 |
| 1282215 | 12/1960 | France . |
| 2196835 | 3/1974 | France . |
| 491664 | 7/1970 | Switzerland . |
| 927697 | 6/1963 | United Kingdom . |
| 927273 | 12/1964 | United Kingdom . |
| 1066830 | 4/1967 | United Kingdom . |
| 1260508 | 1/1972 | United Kingdom . |
| 1275567 | 5/1972 | United Kingdom . |
| 1386246 | 3/1975 | United Kingdom . |
| 1389003 | 4/1975 | United Kingdom . |
| 1413757 | 12/1975 | United Kingdom . |
| 2011799 | 7/1979 | United Kingdom . |

OTHER PUBLICATIONS

Tufnol Industrial Plastics Products and Services, Tufnol Ltd., P.O. Box 376, Perry Barr, Birmingham BY22JB, Sep. 1980, pp. 1-12.

Primary Examiner—Richard V. Fisher
Assistant Examiner—W. Gary Jones
Attorney, Agent, or Firm—Stefan J. Klauber

[57] ABSTRACT

The inner assembly of a tube pressure filter comprises a supporting member or core (6) on which there is a facing assembled from laths (40). Each two adjacent laths (40) define between themselves a duct (42) and an aperture (44). In use, a filter element is provided on the outer surface of the facing. Filtrate passing through the filter element goes through the apertures (44) into the ducts (42) and then flow longitudinally of the inner assembly to a filtrate outlet. After filtration is complete, compressed air may be passed through the ducts (42) and apertures (44) to assist the discharge of filter cake from the filter element.

In another embodiment (FIG. 6), a filter plate unit for a plate filter press comprises a recessed filter plate (102) of which the base of the recess is provided with a facing (112) made up, for example, of a plurality of laths (114). Adjacent laths (114) define between them a duct (116) and an aperture (118), the aperture (118) providing communication between the duct (116) and the region between the facing (112) and a filter cloth provided over the facing. In use of the filter plate unit, filtrate passing through the filter cloth passes through the apertures (118) into the ducts (116) to be discharged through the ports (128).

19 Claims, 7 Drawing Sheets

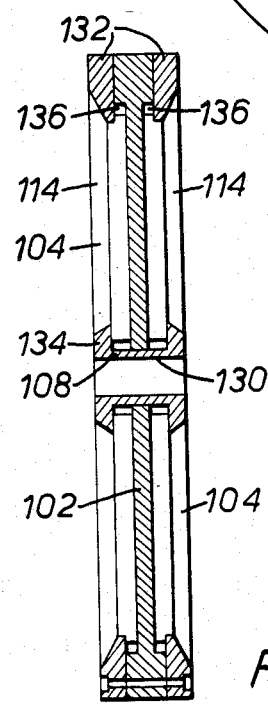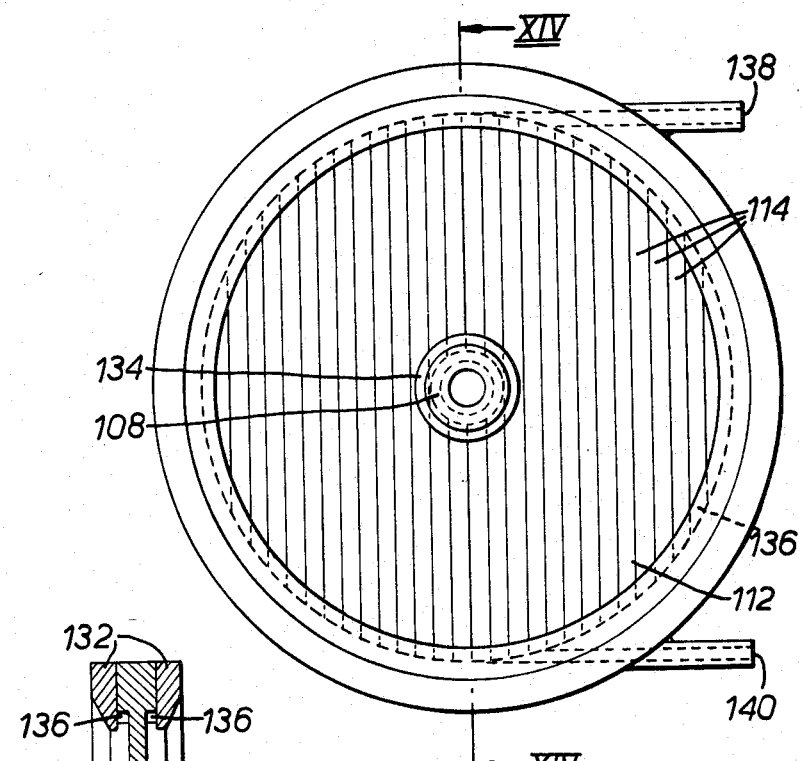
FIG. 13.
FIG. 14.

PRESSURE FILTERS

RELATED APPLICATION

This application is a continuation-in-part of our copending application Ser. No. 572,643, filed on Jan. 20, 1984, and entitled "Pressure Filters", now abandoned.

BACKGROUND OF THE INVENTION

This invention relates to pressure filters.

Two examples of pressure filters are the plate filter press and the tube pressure filter. Two types of plate filter press are in general use, namely the plate and frame press and the recessed plate press. In a recessed plate press, each filter plate unit contains a recess, which is defined by a raised periphery on each side of the filter plate, the raised periphery standing proud of the drainage surface of the filter plate; the maximum thickness of a filter cake formed in such a plate filter press is therefore twice the depth of the recess. A recessed plate filter press is disclosed in our British Patent No. 1,389,003. In a plate and frame press, adjacent filter plates are spaced apart by frames to provide the cavities in which the filter cake is formed.

A more recent development is the membrane filter press in which the filtering chamber is defined on at least one side by a flexible membrane. During filtering, fluid under pressure is introduced between the membrane and the adjacent filter plate to apply a squeeze action to the filter cake to force out further liquid.

In a plate filter press, a filter cloth lies over a filtering surface of each plate (i.e. within the recess or the frame). The filtering surface is often fluted or otherwise provided with formations to enable filtrate to flow behind the filter cloth to one or more outlet ports of the filter plate. Such filter presses suffer from several disadvantages. It is difficult, and often expensive, to provide the necessary formations on the filter plates in a manner which will avoid damage to the filter cloth. Furthermore, some of the filtrate has to travel a large distance, after passing through the filter cloth, before it reaches an outlet port. The same applies to compressed air which is applied through the outlet ports (or other ports) to assist in discharging the filter cake.

Tube pressure filters are disclosed in, for example, British Patent Specifications Nos. 907,485; 1,240,465 and 1,582,957, and in European Patent Specification No. 0036318. The inner assembly of a tube pressure filter generally comprises a central cylindrical section and two end sections of larger diameter which close the ends of, and form seals with, an outer tubular assembly. The central cylindrical seciton serves as a support for a filter medium or element which typically comprises a cylindrical sleeve of filter cloth overlying a coaxial cylindrical sleeve of a relatively open texture material such as wire mesh which supports the cloth and provides channels through which fluid can flow between the cloth sleeve and the outer wall of the cylindrical section of the inner assembly. Hitherto the cylindrical section of the inner assembly has had a large number of holes which conduct filtrate which has passed through the filter medium through the wall of the inner assembly to means for collecting the filtrate and conducting it to the outside of the tube pressure filter. These holes also serve to conduct air or other gas under pressure from the inside of the inner assembly to the underside of the filter medium to assist in detaching filter cake adhering to the filter medium and thus to aid cake discharge.

It has been found that the arrangement described above for conducting filtrate away from and compressed air towards the region between the under surface of the filter medium and the outer wall of the inner assembly suffers from disadvantages. The drilling of a large number of holes through the cylindrical section of the inner assembly inevitably weakens the assembly to some extent and the number of holes which can be provided per unit area of the cylindrical section is therefore limited. It follows that some of the filtrate has to travel a considerable distance (up to about 10 cm) in a direction parallel to the surface of the cylindrical section from the point at which it passes through the filter medium to the nearest hole. The same applies to the compressed air which is introduced behind the filter medium in order to discharge the cake. Also, in order to provide adequate passage for the filtrate and compressed air, the holes must be of relatively large diameter (typically of the order of 5 mm) and it has been found that there is a tendency for the wire mesh sleeve to be extruded into the holes under the high pressure which prevail inside the tube pressure filter (generally in the range 700-2000 psig or 5-14 MPa.) with a consequent risk of damage to the wire mesh, to the overlying filter cloth sleeve and even to the impermeable elastic sleeve. This problem is aggravated if corrosion of the inner assembly occurs since corrosion tends to increase the diameter of the holes.

A further disadvantage of the type of inner assembly described above is that the assembly has generally been in the form of a hollow tube having a relatively large internal volume which must be filled with compressed air every time it is required to supply air pressure to the underside of the filter medium to discharge the cake, and this increases the cost of the compressor and other ancillary equipment needed to provide the compressed air. This problem becomes increasingly serious as the diameter of the inner assembly, and consequently its internal volume, is increased. British Patent Specification No. 1,582,957 discloses one arrangement for alleviating this problem. The inner assembly comprises two coaxial cylinders, the interior of the inner one being isolated from the space between the two cylinders. This reduces the effective volume available within the inner assembly. While effective, this arrangement introduces the need for additional welding in the construction of the inner assembly and adds to the cost of fabrication.

SUMMARY OF THE INVENTION

According to the present invention there is provided a pressure filter including a supporting assembly comprising a supporting member provided with a facing which has an outer surface for supporting a filter medium in use of the pressure filter, the facing defining a duct disposed inwardly of the outer surface for conveying liquid generally parallel to the outer surface, and an aperture for providing communication between the duct portion and the region between the outer surface of the facing and the filter medium.

The pressure filter may be a tube pressure filter comprising an inner assembly, constituting the supporting assembly, and a generally tubular outer assembly which surrounds the inner assembly to provide between the two assemblies an annular chamber which is divided into inner and outer compartments by an impermeable diaphragm disposed within the outer assembly, a filter element, constituting the filter means, disposed within the inner compartment adjacent the outer surface of the inner assembly, means for supplying a mixture of a liquid and a particulate solid to the inner compartment and means for supplying fluid under pressure to the outer compartment so as to cause the liquid in the inner compartment to be forced through the filter element leaving the particulate solid deposited on the filter element, the liquid passing through the aperture or apertures into the duct or ducts to be conducted longitudinally of the inner assembly.

An embodiment of a tube pressure filter in accordance with the present invnetion has an inner assembly which provides good support for the filter medium and adequate passage for fluids to and from the region between the filter medium and the outer wall of the inner assembly, and which reduces the volume which must be filled with compressed air for the purpose of discharging filter cake adhering to the filter medium.

The volume occupied by the duct or ducts and aperture or apertures is preferably in the range 1/10 to 1/100, more preferably 1/30 to 1/60, of the total volume of the inner assembly.

In a preferred construction, the duct extends longitudinally of the inner assembly. At one end of the inner assembly there may be a collecting chamber for filtrate, from which the filtrate may be conducted to the outside of the tube pressure filter. Similarly, there may be at one end of the inner assembly a distributing chamber to which compressed air can be supplied on its way to the duct. These chambers may be at opposite ends of the inner assembly, and the duct may extend between them. The duct is preferably one of several ducts distributed around the inner assembly and, where the collecting and distributing chambers are provided, all of the ducts open into these chambers.

The inner assembly advantageously comprises a tubular member, for example a length of steel tube, provided with end sections of larger diameter, Alternatively, however, the tubular member could be a solid member and can be manufactured from metal, wood, plastics, ceramics or a cementitious material such as concrete.

The end sections are preferably of the type described in British Patent Specification No. 1,573,607 in which at least one of the end sections is provided with a substantially annular passage which is inclined outwardly from the central axis of the inner assembly and towards the transverse central plane of the inner assembly. This passage serves to introduce the mixture to be pressure filtered into the inner compartment and communicates with an ante-chamber into which the mixture is introduced through a feed conduit. The feed conduit includes or co-operates with a non-return or power-operated valve which closes the bore of the feed conduit when the inner compartment contains a mixture under high pressure, to prevent flow back through the feed conduit and also any flow of feed mixture during cake discharge.

Each end section preferably comprises a fairing which effects a gradual change in the diameter of the end section from the larger diameter at the extreme ends of the inner assembly to the smaller diameter of the central cylindrical section. Each fairing may be provided with an annular groove in its outwardly facing surface to enable the ends of the filter cloth sleeve to be secured to the outwardly facing surface of the fairing in the manner described in British Patent Specification No. 1,598,425. Each end section is preferably provided at its inner, or smaller diameter end with an annular groove adjacent to the surface of the central cylindrical section.

In a preferred construction, the tubular inner assembly comprises a tubular supporting member or core having the facing on its outer surface, which facing is conveniently assembled from a plurality of laths.

Many different materials may be used for forming the laths. They may be, for example, of metal, such as aluminium or stainless steel, or other metallic materials, or of vitreous or ceramic materials, or of a suitable hardwood, or most advantageously, of a suitable plastics material. An especially suitable material is of the type produced by impregnating layers of a textile material with a thermosetting resin, although other plastics materials, such as poly(methyl methacrylate), may be used.

The laths are formed separately from the supporting member and conveniently secured to the outer surface of the inner assembly by means of an adhesive. An adhesive of the epoxy resin type has been found to be especially suitable. The first lath is accurately aligned parallel to the longitudinal axis of the inner assembly and may be secured with screws for additional stability. The remaining laths are then attached one by one using already located laths as a guide.

In a preferred embodiment, the laths are shaped so that the or each duct and aperture is defined between each adjacent pair of laths. The or each aperture may comprise a slot, which can extend over substantially the full length of the respective duct.

Each of the laths which make up the facing for the central cylindrical section is preferably provided with a spigot which co-opoerates with the annular groove in the end section as mentioned above, to locate the end sections with respect to the laths. The annular groove may be made deeper than the length of the spigot to provide the annular collecting or distribution chamber for the filtrate or for the compressed air or other gas.

Advantageously, the inner end of each end section is machined after being located on the central cylindrical section so that the inner end of each fairing is flush with the outer surface of the facing of laths. This ensures that no sharp step exists where the laths meet the fairing and thus prevents possible damage to the filter cloth sleeve or the impermeable elastic sleeve during use of the tube pressure filter.

Preferably the outer faces of the laths are so shaped that together they form a facing which has a fluted or corrugated appearance after the manner described in British Patent Specification No. 1,386,246. The inner face of each lath is preferably provided with a cut-away portion which enables the lath to fit more exactly the cylindrical surface of the core of the inner assembly and which provides free space into which surplus adhesive can flow.

In alternative embodiments, the facing comprises a single cylindrical sleeve, or a shell comprising two or more part-cylindrical segments.

Further advantages of an inner assembly constructed according to the invention are that the core of the central cylindrical section is substantially protected against corrosion, and a corrugated or fluted outer surface for the inner assembly may be provided without weakening the central cylindrical section, as would be the case if the corrugated or fluted appearance were provided by a milling operation.

The pressure filter may alternatively be a plate filter press comprising a plurality of filter plate units each of which comprises a filter plate, constituting a said supporting assembly and having on each side a filter element, constituting a said filter medium.

The facing may be assembled from a plurality of facing elements which may, for example, comprise laths. With such a construction, the duct and/or the aperture may be defined between adjacent facing elements. The aperture may be a slot.

Where the facing is made up of laths, the laths may be elongate and extend vertically. There will thus be a plurality of ducts and apertures defined between adjacent laths. In use, filtrate reaching the ducts will fall under gravity to the bottom of the ducts. If the filter plate is square, the laths may be formed to provide a bottom channel which interconnects the lower ends of the ducts and communicates with an outlet port for discharging filtrate to the outside of the filter plate unit. Where the filter plate is circular, the laths may be formed to provide a continuous circumferential channel extending around the periphery of the facing, this channel also communicating with an outlet port for discharging filtrate to the outside. The filtrate outlet would normally be at the lower extremity of the filter plate, but there may also be an opening at the top of the filter plate, either for discharging filtrate or for receiving compressed air or other gas for discharging the filter cake after a filter pressing operation. Where the filter plates are square, the top ends of the laths may also be formed to provide a top channel communicating with the upper port and interconnecting the top ends of the ducts.

Instaed of constructing the facing from vertical elongate laths, the facing may be made up, in circular plates, from, for example, sector-shaped elements or from strip material laid on the face of the filter plate in the form of a spiral. The spiral could be a multi-start spiral, in order to provide a greater density of ducts towards the outside of the facing.

BRIEF DESCRIPTION OF THE DRAWINGS

FIG. 13 is a view of one face of another form of filter plate unit; and

FIG. 14 is a sectional view taken along the line XIV—XIV in FIG. 13.

DETAILED DESCRIPTION OF PREFERRED EMBODIMENTS

Figure 1:
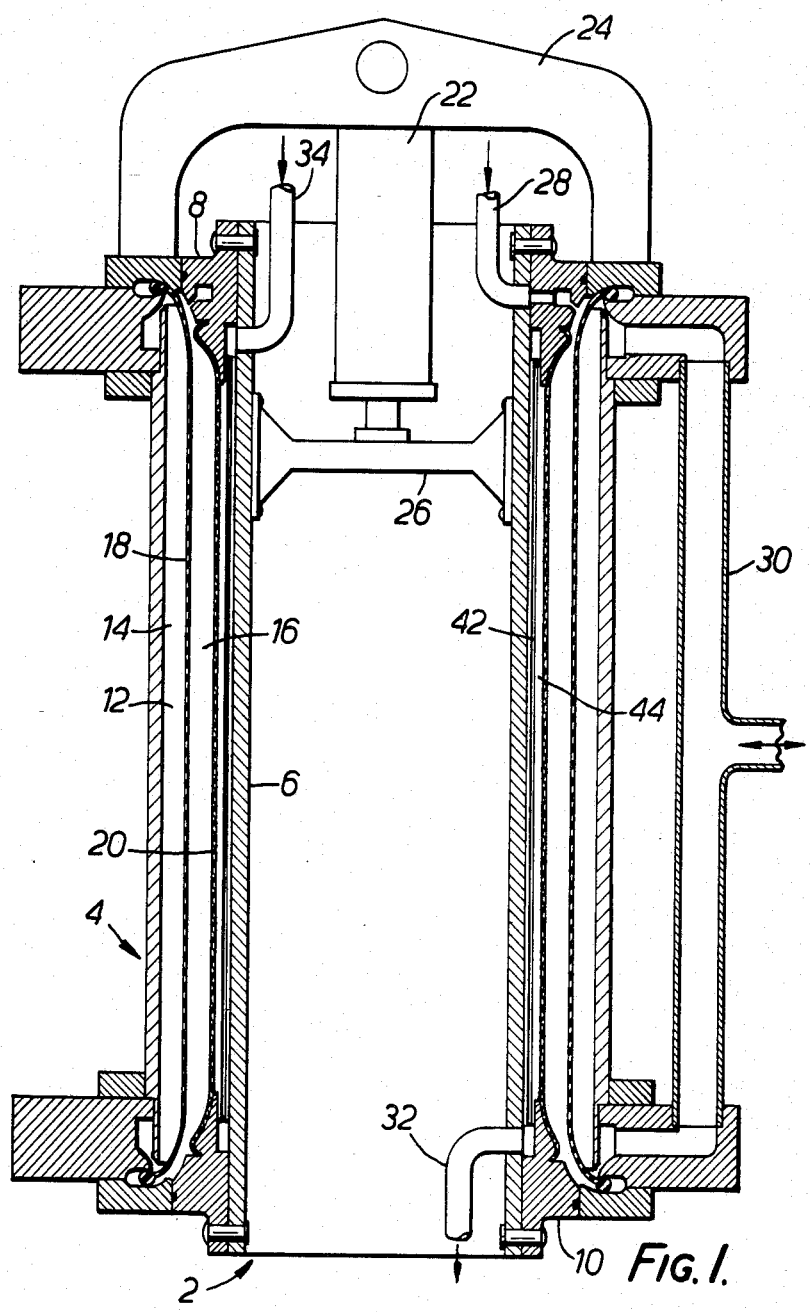
FIG. 1 is a sectional view of a tube pressure filter.

The tube pressure filter shown in FIG. 1 comprises an inner assembly 2 and a generally tubular outer assembly 4. The inner assembly 2 comprises a core 6 in the form of a tubular member to which are riveted two end sections 8 and 10. In the position shown in FIG. 1, the end sections 8 and 10 are in sealing engagement with the outer assembly 4 to define an annular chamber 12 between the inner and outer assemblies 2 and 4. The chamber 12 is divided into two compartments 14 and 16 by a flexible, impermeable diaphragm 18 which is secured within the outer assembly 4. The outer surface of the inner assembly 2 is provided with a filter element 20.

A fluid operated ram 22 is mounted on a spider 24 which is rigidly fixed to the outer assembly 4. The piston rod of the ram 22 is connected by a crossbar 26 to the tubular member 6.

In operation of the tube pressure filter of FIG. 1, a mixture comprising a liquid and a particulate solid is fed into the inner compartment 16 through a feed conduit 28. When the inner compartment 16 is full, the supply of mixture is terminated by a shut-off valve and fluid, such as water, is supplied under high pressure through an inlet manifold 30 to the outer compartment 14. The pressure of the water acting on the diaphragm 18 forces the liquid component of the mixture through the filter element 20 and it eventually flows, as will be described later, to a filtrate outlet conduit 32. During this operation, the solid component of the mixture is deposited on the filter element 20 in the form of a filter cake.

At the end of the pressing operation, the water is withdrawn under vacuum from the outer compartment 14 through the manifold 30, and the ram 22 is actuated to lower the inner assembly 2 relatively to the outer assembly 4, which results in the inner compartment 16 communicating with the outside. Compressed air is then supplied through an inlet conduit 34, and this air passes to the region beneath the filter element 20 to cause the filter cake to be detached so that it falls from the tube pressure filter. The inner assembly 2 is then returned to the position shown in FIG. 1 by the ram 22, and the next cycle begins.

Figure 2:
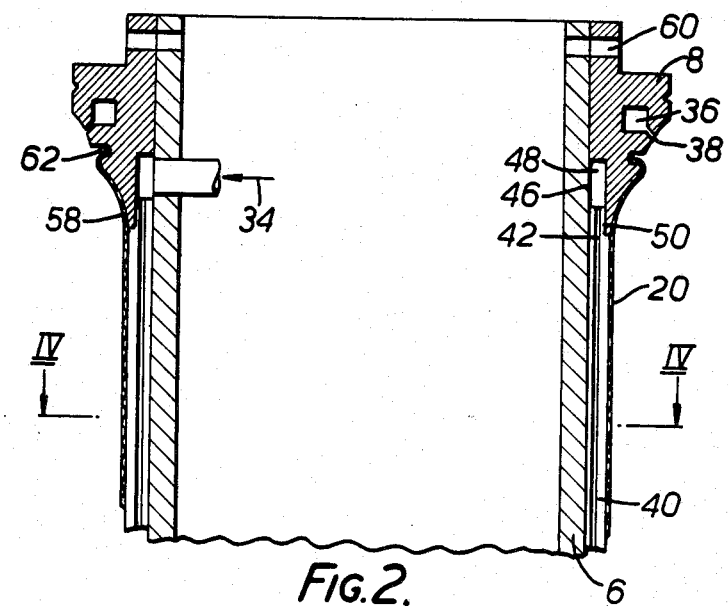
FIG. 2 is a sectional view on an enlarged scale of the upper end of an inner assembly of the tube pressure filter of FIG. 1.
Figure 3:
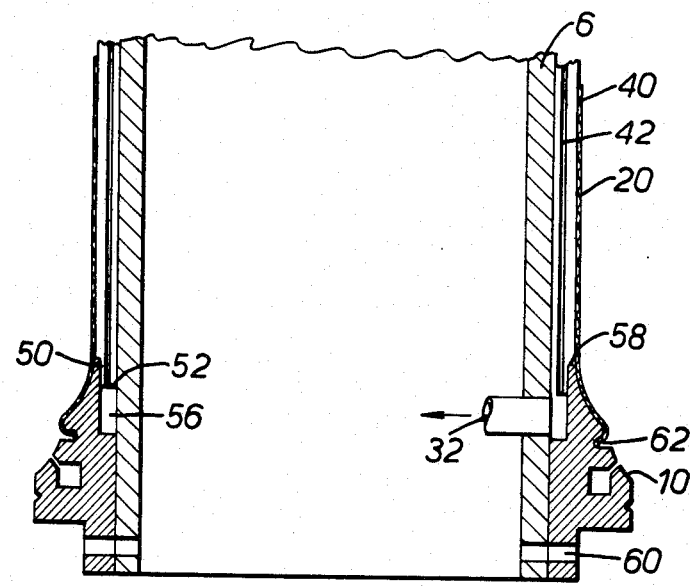
FIG. 3 corresponds to FIG. 2, but shows the lower end of the inner assembly.

Referring to FIGS. 2 and 3, the inner assembly of the tube pressure filter is shown, comprising the tubular member 6 consisting of a length of steel tubing, the upper end section 8, and the lower end section 10. The upper end section 8 is provided with an annular antechamber 36 into which the mixture to be pressure filtered is introduced and a narrow annular passage 38, which is inclined outwardly and downwardly towards the transverse central plane of the inner assembly, through which the mixture passes under pressure into the inner compartment 16 of the tube pressure filter.

Figure 4:
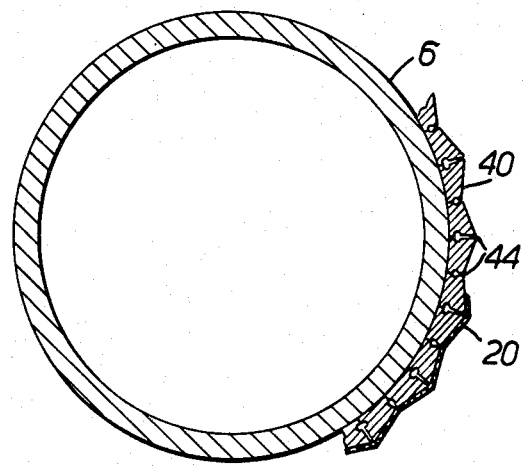
FIG. 4 is a transverse section taken on the line IV to IV in FIG. 2.
Figure 5:
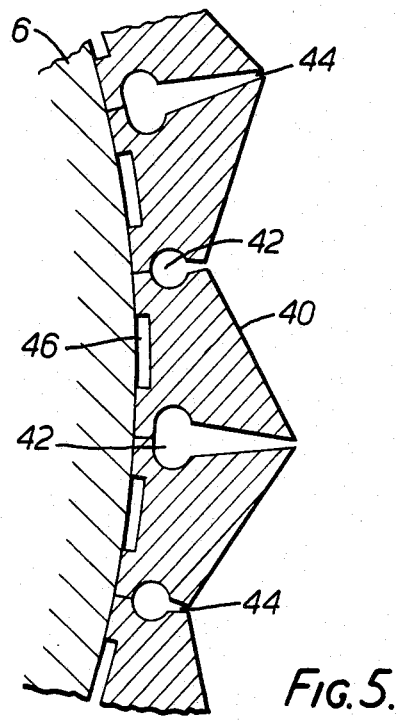
FIG. 5 is an enlarged fragmentary view of part of FIG. 4.

Around the tubular member 6 there is assembled a facing comprising a plurality of laths 40 which are parallel to the longitudinal axis of the assembly and extend over substantially the full length of the tubular member 6 between the end sections 8 and 10. Each lath 40 has side edges so shaped that a pair of adjacent laths define between them a longitudinal duct 42 and a narrow, outwardly-opening slot 44 (FIGS. 4 and 5). The average width of the slot 44 at its outward end is approximately 0.5 mm. The outward faces of the laths are so shaped that the assembled facing has a fluted surface as described in British Patent specification No. 1,386,246, and the inner faces are provided with a cut-away channel 46 which enables the laths to fit more closely the cylindrical surface of the tubular member 6 and also provides free space to accommodate surplus adhesive.

Figure 6:
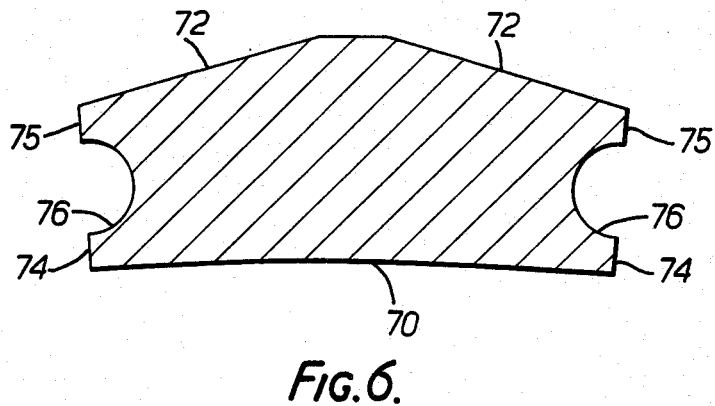
FIG. 6 is an enlarged sectional view of one alternative configuration for the facing elements shown in FIG. 5.
Figure 7:
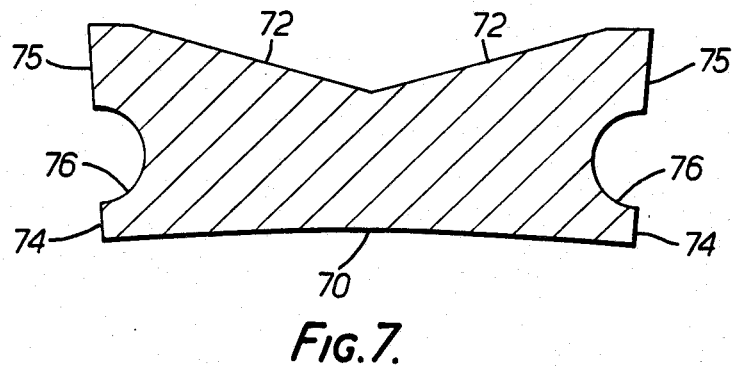
FIG. 7 corresponds to FIG. 5 but shows another alternative configuration.

Alternative shapes for the laths 40 are shown in FIGS. 6 and 7. It will be appreciated that the laths of FIGS. 6 and 7 have double the width of the laths 40 in FIG. 5. Laths as shown in FIG. 6 will meet each other at the troughs of the fluted outer surface of the facing, whereas laths as shown in FIG. 7 will meet each other as the peaks of the fluted surface. The laths shown in FIGS. 6 and 7 each have a curved inner surface 70, to match the outer surface of the tubular member 6, and an outer surface which is made up of two sloping portions 72. The edges of the lath are made up of two straight portions 74 and 75 disposed one on each side of a curved recess 76. When in position the portions 74 of adjacent laths abut each other and the recesses 76 define the ducts 42. The portions 75, however, do not abut each other, and thus form the apertures 44.

The facing is assembled by first aligning one lath accurately parallel with the longitudinal axis of the inner assembly and at a position such that its two ends are equidistant from the two ends of the tubular member 6.

The first lath is conveniently fixed in place using both screws and adhesive. A second lath is then laid alongside the first and secured with adhesive and the process is repeated with subsequent laths until the complete facing has been constructed. The laths are formed from a different material from the tubular member 6. In particular, the material of the laths is one which is more easily formed to a desired shape, for example by machining, than that of the tubular member 6. A prefered material for the lath is an impermeable material known under the Trade Mark "TUFNOL", which comprises a laminate based on thermosetting phenolic, epoxide or polyimide resins reinforced with fabric, paper or glass fibre reinforcement. Where fabric or glass fibre reinforcements are used, they are preferably woven.

The upper end section 8 is provided at its inner end with a deep annular groove 46. The inner portion 48 of this groove serves as an annular distribution chamber into which compressed air is introduced, for the purpose of discharging filter cake, through the conduit 34. The outer portion of the groove 46 accommodates and locates a spigot portion 50 which is provided at each end of each lath.

The lower end section 10 is provided with a smilar deep groove 52, the inner portion 4 of which serves as an annular chamber 56 for the collection of filtrate which is discharged from the inner assembly through the conduit 32. The outer portion of the groove 52 again accommodates the spigot portions 50 of the laths. The end sections are slid on to the central cylindrical section when the facing of laths is complete and the smaller diameter ends of the end sections are then machined at 58 until the fairings are flush with the outer surface of the facing.

Holes 60 are provided through the outer ends of the end sections and through the tubular member 6 to enable the end sections to be fixed in place by, for example, nut and bolt assemblies or rivets.

The central section of the inner assembly is covered by the filter element 20 which comprises a woven filter cloth sleeve fitting tightly over a coaxial felt backing cloth sleeve which in turn fits snugly over the facing of laths 6. A cylindrical sleeve of wire or plastics mesh material may be inserted between the felt backing cloth sleeve and the facing of laths if further improvement in drainage for filtrate is found to be necessary. The filter element is secured at its two ends by tying with cord after the manner described in British Patent Specification No. 1,598,425, an annular groove 62 being provided in the fairing or each end section for this purpose.

Although this embodiment of the present invention has been described in relation to one particular form of tube pressure filter, it will be appreciated that the features of the invention can be applied to other forms of tube pressure filters, for example that disclosed in European Patent Specification No. 0036318. It can also be applied to tube pressure filters in which the filter element is disposed on the inner surface of the outer assembly, the mixture of the liquid and particulate solid then being supplied to the outer compartment, while the fluid under pressure is supplied to the inner compartment.

In the embodiment of FIGS. 8 to 14, the filter element which would normally be a filter cloth, and any backing element for supporting the filter element, are omitted for the sake of clarity.

Figure 8:
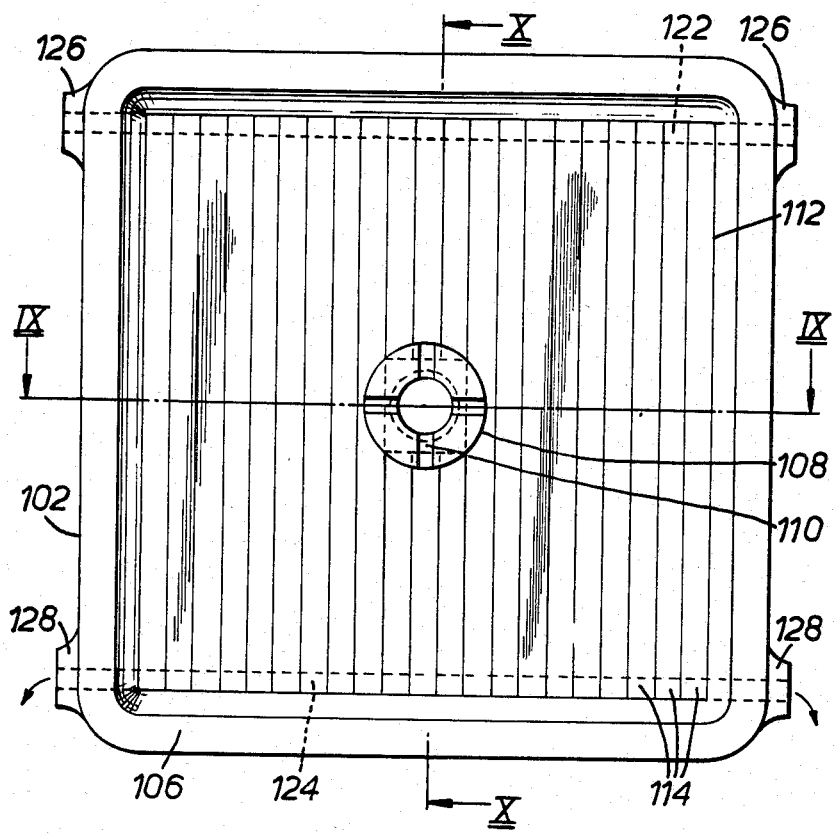
FIG. 8 is a view of one face of a filter plate unit.
Figure 9:
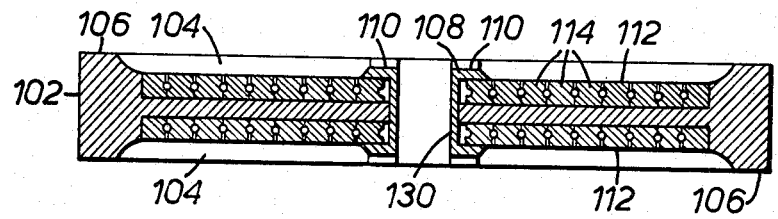
FIG. 9 is a sectional view taken on the line IX—IX in FIG. 8.
Figure 10:
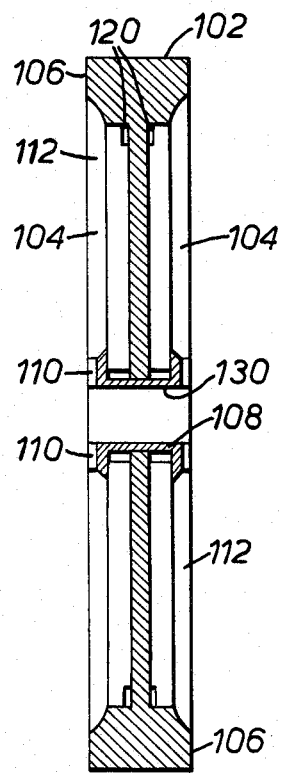
FIG. 10 is a sectional view taken on the line X—X in FIG. 8.

FIGS. 8 to 10 show a square filter plate unit. The filter plate unit comprises a recessed filter plate 102 provided on each face with an annular recess 104 defined between a raised outer periphery 106 and an inner hub 108. Each face of the hub 108 is provided with grooves 110.

The base of the recess is provided with a facing 112 which is made up of a plurality of elongate strips or laths 114. The laths 114 are disposed vertically, and most of them extend from the top to the bottom of the recess 112. However, the laths adjacent the hub 108 are in two parts in order to accommodate the hub 100, which is not an integral part of the filter plate 102, but is fitted after the laths have been positioned.

Figure 12:
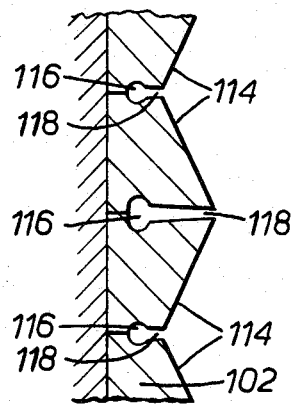
FIG. 12 is an enlarged fragmentary view of part of FIG. 9.

As shown in FIGS. 9 and 12, each pair of adjacent laths 114 define between them a duct 110 and an aperture 118 which is in the form of a slot. In FIG. 9, the outer faces of the laths are illustrated as forming a flat surface, whereas in FIG. 12, the laths are shaped to provide a fluted surface.

Figure 11:
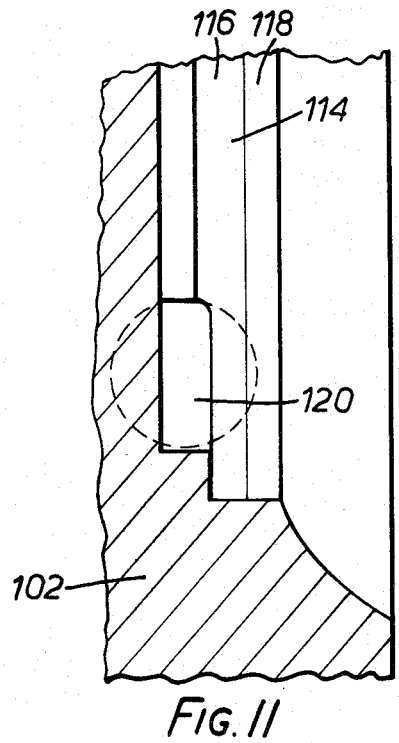
FIG. 11 is an enalrged fragmentary view of part of FIG. 10.

As shown in FIGS. 10 and 11, the top and bottom ends of each lath are provided with a notch 120. At the top and bottom of the filter plate unit, these notches define top and bottom channels 122 and 124 (FIG. 8), and these channels communicate, respectively, with ports 126 and 128 in the filter plate.

Although not shown it may be desirable to provide, as well as the top and bottom channels 122 and 124, one or more intermediate channels such as are illustrated, for example, in FIG. 14 of British Patent Specification No. 1413757.

A plate filter press comprises a plurality of filter plate units as described above with reference to FIGS. 8 to 11. For example, the filter press may comprise one hundred plates. The plates are brought in to face-to-face engagement, contacting each other at the peripheries 106 and the hubs 108, and are held together under pressure. A filter cloth is positioned over the surface defined by the laths 14, possibly with a backing cloth provided between the filter cloth and the laths. Slurry to be pressure filtered is supplied through the central passage made up of the adjoining openings 130 in the hubs 108, and this slurry passes into the cavities defined between adjacent filter plate units through the grooves 110. From the cavities, the liquid component of the slurry, or filtrate, passes through the filter cloth, leaving the solid component deposited on the filter cloth in the form of a filter cake. When it has passed through the filter cloth, the filtrate travels along the surface of the facing 112 until it reaches one of the slots 118. The filtrate then passes through the slot 118 to the respective duct 116 through which it falls under gravity until it reaches the channel 124. The filtrate flows along the channel 104 and out of the port 128. It is possible that the flow of filtrate will be sufficiently great to cause some of it to flow upwardly along the ducts 116 to the top channel 122, in which case this portion of the filtrate will be discharged through the ports 126.

When pressure filtration has proceeded for a length of time sufficient to cause the optimum build-up of filter cake in the cavities, the supply of slurry is discontinued and the plates are separated from each other. In order to assist discharge of the filter cake from the filter cloth, compressed air can be supplied through the ports 126. This compressed air will travel into the ducts 116 to provide a blast of air through the slots 118 to blow the filter cake off the filter cloth.

The alternative form shown in FIGS. 13 and 14 corresponds in many ways to that of FIGS. 8 to 11, and so corresponding parts have been given similar reference numerals. FIGS. 13 and 14 show a circular recessed filter plate unit which comprises a filter plate 102 to which are bolted outer rings 132 and two hub elements 134 to provide the hub 108 with the central aperture 130. As with the embodiments of FIGS. 9 to 11 an annular recess 104 is thus provided on each face of the filter plate unit. On the bottom of each recess 104, there is a facing 112 made up of vertically disposed laths 114. The cross-sectional configuration of these laths 114 may be identical to those of FIGS. 11 or 12, providing the ducts 116 and the slots 118.

The laths 114 of FIGS. 13 and 14 are formed at their ends in such a manner that a continuous channel 136 extends around the periphery of the facing 112, this channel communicating with top and bottom parts 138 and 140.

In use, the filter plate unit of FIGS. 13 and 14 functions in generally the same manner as that of FIGS. 8 to 11, filtrate passing through the filter cloth and the slots 118 to the ducts 116, from which it flows into the channel 136 and out of the lower port 140, possibly also flowing out of the upper port 138. As before, compressed air can be supplied through the upper port 138 in order to assist cake discharge.

Although this embodiment of the invention has been described with specific reference to recessed plate filter presses, it will be appreciated that it can also be applied to plate and frame presses. Also, it will be appreciated that the features of the invention could be applied to membrane filter presses. In particular, a facing in accorance with the present invention could be applied to a flexible membrane, provided that the facing is made of sufficiently flexible material. For example, the facing could be made from plastics material. Where flexibility of the facing is less important, the facing could be made from, for example, metal, such as aluminium or stainless steel, or other suitable material such as hardwood. However, even where flexibility is not required, a suitable plastics material is preferred. An especially suitable material is that sold under the name "TUFNOL", as referred to above.

The facing is conveniently secured to the surface of the filter plate by means of an adhesive. An adhesive of the epoxy resin type has been found to be especially suitable. Where, as described above, the facing is made up of laths 114, the first lath is accurately aligned on the filter plate so as to be vertical in use, and may be secured with screws for additional stability. The remaining laths are then attached one by one using already located laths as a guide.

We claim:

1. A supporting assembly for a pressure filter, comprising:
   (a) a supporting member having an outer surface;
   (b) a facing having an inner surface supported over substantially the whole of its area by the outer surface of the supporting member, and an outer surface means for supporting a filter medium in use of the pressure filter;
   (c) the facing formed by a plurality of facing elements comprising laths which are applied to the outer surface of the supporting member in abutment with one another;
   (d) adjacent ones of the facing elements defining between them:
      (i) a duct disposed inwardly of the outer surface for conveying liquid generally parallel to the outer surface, and
      (ii) an aperture which is narrower than the duct, for providing communication between the duct and the region between the outer surface of the facing and the filter medium.

2. A supporting assembly as claimed in claim 1, in which the duct is one of a plurality of ducts, each duct having a said aperture.

3. A supporting assembly as claimed in claim 1, in which the aperture comprises a slot which extends along substantially the entire length of the respective duct.

4. A supporting assembly as claimed in claim 1, in which the facing elements are made of impermeable material produced by impregnating layers of a woven textile material with a thermosetting resin.

5. A supporting assembly as claimed in claim 1, in which the facing elements are fixed to the supporting member by an adhesive.

6. A supporting assembly as claimed in claim 1, in which the facing elements are so shaped that the outer surface of the facing has a fluted or corrugated appearance.

7. A tube pressure filter comprising:
   an inner assembly having an outer surface;
   a generally tubular outer assembly which surrounds the inner assembly to provide between the inner and outer assemblies an annular chamber;
   an impermeable diaphragm which is disposed within the outer assembly and which divides the chamber into inner and outer compartments;
   a filter element disposed within the inner compartment;
   a facing provided on the outer surface of the inner assembly, the facing having an outer surface supporting the filter element and comprising a plurality of facing elements comprising laths which are applied to the outer surface of the inner assembly in abutment with one another, adjacent ones of the facing elements defining between them a duct disposed inwardly of the outer surface of the facing for conveying liquid generally parallel to the outer surface of the facing, and an aperture which is narrower than the duct for providing communication between the duct and the region between the outer surface of the facing and the filter element;

means for supplying a mixture of a liquid and a particulate solid to the inner compartment; and means for supplying fluid under pressure to the outer compartment so as to cause the liquid in the inner compartment to be forced through the filter element leaving the particulate solid deposited on the filter element, the liquid passing through the aperture into the duct to be conducted longitudinally of the inner assembly.

8. A tube pressure filter as claimed in claim 7, in which the duct extends longitudinally of the inner assembly.

9. A tube pressure filter comprising:

an inner assembly having an outer surface;

an end section mounted at each end of the inner assembly;

a generally tubular outer assembly which surrounds the inner assembly to provide between the inner and outer assemblies an annular chamber;

an impermeable diaphragm which is disposed within the outer assembly and which divides the chamber into inner and outer compartments;

a filter element disposed within the inner compartment;

a facing provided on the outer surface of the inner assembly, the facing comprising a plurality of facing elements comprising laths which are applied to the outer surface of the inner assembly in abutment with one another and extend longitudinally of the inner assembly, each facing element being provided with a pair of oppositely directed projections which engage the end sections to locate the end sections with respect to the facing elements, the facing having an outer surface supporting the filter element, adjacent ones of the facing elements defining between them a duct disposed inwardly of the outer surface of the facing for conveying liquid generally parallel to the outer surface of the facing, and an aperture which is narrower than the duct for providing communication between the duct and the region between the outer surface of the facing and the filter element;

means for supplying a mixture of a liquid and a particulate solid to the inner compartment; and means for supplying fluid under pressure to the outer compartment so as to cause the liquid in the inner compartment to be forced through the filter element leaving the particulate solid deposited on the filter element, the liquid passing through the aperture into the duct to be conducted longitudinally of the inner assembly.

10. A tube pressure filter as claimed in claim 9, in which each end section is provided with an annular groove receiving a respective one of the projections of each facing element.

11. A tube pressure filter as claimed in claim 10, in which the depth of the groove in at least one of the end sections is greater than the lengths of the projections received in it, whereby a chamber is provided at the base of the groove.

12. A tube pressure filter comprising:

an inner assembly;

a generally tubular outer assembly which has an inner surface and which surrounds the inner assembly to provide between the inner and outer assemblies an annular chamber;

an impermeable diaphragm which is disposed within the outer assembly and which divides the chamber into inner and outer compartments;

a filter element disposed within the outer compartment;

a facing provided on the inner surface of the outer assembly, the facing having an inner surface supporting the filter element and comprising a plurality of facing elements comprising laths which are applied to the inner surface of the outer assembly in abutment with one another, adjacent ones of the facing elements defining between them a duct disposed outwardly of the inner surface of the facing for conveying liquid generally parallel to the inner surface of the facing, and an aperture which is narrower than the duct for providing communication between the duct and the region between the inner surface of the facing and the filter element;

means for supplying a mixture of a liquid and a particulate solid to the outer compartment; and means for supplying fluid under pressure to the inner compartment so as to cause the liquid in the outer compartment to be forced through the filter element leaving the particulate solid deposited on the filter element, the liquid passing through the aperture into the duct to be conducted longitudinally of the outer assembly.

13. A filter plate unit for a plate filter press comprising a filter plate having opposite sides;

a filter element on each side of the filter plate; and a facing on each side of the filter plate, the facing having an outer surface which supports the filter element and comprising a plurality of facing elements comprising laths which are applied to the respective side of the filter plate in abutment with one another, adjacent ones of the facing elements defining between them a duct disposed inwardly of the outer surface for conveying fluid generally parallel to the outer surface, and an aperture which is narrower than the duct which provides communication between the duct and the region between the outer surface of the facing and the filter element.

14. A filter plate unit as claimed in claim 13, in which the duct on each side of the filter plate is one of a plurality of ducts on that side of the filter plate and in which a channel is provided on each side of the filter plate which interconnects at least some of the respective ducts and provides communication between those ducts and a port on the filter plate.

15. A filter plate unit as claimed in claim 14, in which the filter plate is rectangular with two of its sides disposed horizontally, the channel on each side of the filter plate being provided at the bottom of the respective facing.

16. A filter plate unit as claimed in claim 15, in which the filter plate has an additional port and a further channel is provided on each side of the filter palte at the top of the respective facing, each further channel communicating with the additional port in the filter plate.

17. A filter plate unit as claimed in claim 14, in which each filter plate is circular, the channel being continuous and extending around the periphery of the respective facing.

18. A filter plate unit as claimed in claim 14, in which each channel is provided by a recess formed in the respective facing.

19. A supporting assembly for a pressure filter, comprising:
(a) a common supporting member having an outer surface;
(b) a facing having an inner surface supported over substantially the whole of its area by the outer surface of the supporting member, and an outer surface means for supporting a filter medium in use of the pressure filter;
(c) the facing including a plurality of facing elements comprising laths which are applied to the outer surface of the common supporting member in side-by-side relation with adjacent edges in abutment with one another;
(d) adjacent ones of the facing elements defining between them:
  (i) a duct disposed inwardly of the outer surface for conveying liquid generally parallel to the outer surface, and
  (ii) an aperture which is narrower than the duct, for providing communication between the duct and the region between the outer surface of the facing and the filter medium.

* * * * *

UNITED STATES PATENT AND TRADEMARK OFFICE
CERTIFICATE OF CORRECTION

PATENT NO.   : 4,789,471
DATED        : December 6, 1988
INVENTOR(S)  : George W. Wall et al It is certified that error appears in the above-identified patent and that said Letters Patent is hereby corrected as shown below:

On the title page Insert

--(76) Assignee: ECC International Limited,
                 St. Austell, England --.

Signed and Sealed this

Twentieth Day of November, 1990

Attest:

HARRY F. MANBECK, JR.

*Attesting Officer*

*Commissioner of Patents and Trademarks*